Oct. 5, 1965 E. L. PERRY ETAL 3,210,737

ELECTRONIC DATA PROCESSING

Filed Jan. 29, 1962 5 Sheets-Sheet 1

INVENTORS
C.D. MORRISO
E.L. PERRY
BY F. J. Sullivan
ATTORNEY

ELECTRONIC DATA PROCESSING

Filed Jan. 29, 1962 5 Sheets-Sheet 2

INVENTORS
C.D. MORRISON
E.L. PERRY
BY
ATTORNEY

INVENTORS
C. D. MORRISON
E. L. PERRY
BY
F. P. Sullivan
ATTORNEY

ELECTRONIC DATA PROCESSING

Filed Jan. 29, 1962 5 Sheets-Sheet 4

INVENTORS
C.D. MORRISON
E.L. PERRY
BY
ATTORNEY

| SHIFT PLACES | BASIC SHIFTS LEFT 16 | LEFT 8 | LEFT 4 | LEFT 1 | RIGHT 1 |
|---|---|---|---|---|---|
| 1 | 0 | 0 | 0 | 1 | 0 |
| 2 | 0 | 0 | 0 | 2 | 0 |
| 3 | 0 | 0 | 1 | 0 | 1 |
| 4 | 0 | 0 | 1 | 0 | 0 |
| 5 | 0 | 0 | 1 | 1 | 0 |
| 6 | 0 | 1 | 0 | 0 | 2 |
| 7 | 0 | 1 | 0 | 0 | 1 |
| 8 | 0 | 1 | 0 | 0 | 0 |
| 9 | 0 | 1 | 0 | 1 | 0 |
| 10 | 0 | 1 | 0 | 2 | 0 |
| 11 | 0 | 1 | 1 | 0 | 1 |
| 12 | 0 | 1 | 1 | 0 | 0 |
| 13 | 0 | 1 | 1 | 1 | 0 |
| 14 | 1 | 0 | 0 | 0 | 2 |
| 15 | 1 | 0 | 0 | 0 | 1 |
| 16 | 1 | 0 | 0 | 0 | 0 |
| 17 | 1 | 0 | 0 | 1 | 0 |

Fig. 5b

| SHIFT PLACES | BASIC SHIFTS RIGHT 16 | RIGHT 8 | RIGHT 4 | RIGHT 1 | LEFT 1 | CHARACTERISTIC DIFFERENCE 5 | 4 | 3 | 2 | 1 |
|---|---|---|---|---|---|---|---|---|---|---|
| 1 | 0 | 0 | 0 | 1 | 0 | 0 | 0 | 0 | 0 | 1 |
| 2 | 0 | 0 | 0 | 2 | 0 | 0 | 0 | 0 | 1 | 0 |
| 3 | 0 | 0 | 1 | 0 | 1 | 0 | 0 | 0 | 1 | 1 |
| 4 | 0 | 0 | 1 | 0 | 0 | 0 | 0 | 1 | 0 | 0 |
| 5 | 0 | 0 | 1 | 1 | 0 | 0 | 0 | 1 | 0 | 1 |
| 6 | 0 | 1 | 0 | 0 | 2 | 0 | 0 | 1 | 1 | 0 |
| 7 | 0 | 1 | 0 | 0 | 1 | 0 | 0 | 1 | 1 | 1 |
| 8 | 0 | 1 | 0 | 0 | 0 | 0 | 1 | 0 | 0 | 0 |
| 9 | 0 | 1 | 0 | 1 | 0 | 0 | 1 | 0 | 0 | 1 |
| 10 | 0 | 1 | 0 | 2 | 0 | 0 | 1 | 0 | 1 | 0 |
| 11 | 0 | 1 | 1 | 0 | 1 | 0 | 1 | 0 | 1 | 1 |
| 12 | 0 | 1 | 1 | 0 | 0 | 0 | 1 | 1 | 0 | 0 |
| 13 | 0 | 1 | 1 | 1 | 0 | 0 | 1 | 1 | 0 | 1 |
| 14 | 1 | 0 | 0 | 0 | 2 | 0 | 1 | 1 | 1 | 0 |
| 15 | 1 | 0 | 0 | 0 | 1 | 0 | 1 | 1 | 1 | 1 |
| 16 | 1 | 0 | 0 | 0 | 0 | 1 | 0 | 0 | 0 | 0 |
| 17 | 1 | 0 | 0 | 1 | 0 | 1 | 0 | 0 | 0 | 1 |

Fig. 5a

*INVENTORS*
C. D. MORRISON
E. L. PERRY
*BY* [signature]
ATTORNEY

United States Patent Office 3,210,737

Patented Oct. 5, 1965

3,210,737

ELECTRONIC DATA PROCESSING

Edward L. Perry, Norfolk, and Channing D. Morrison, Burlington, Mass., assignors to Sylvania Electric Products, Inc., a corporation of Delaware Filed Jan. 29, 1962, Ser. No. 169,333
5 Claims. (Cl. 340—172.5)

This invention is concerned with electronic data processing equipment, and particularly with improvements in shift registers useful in such equipment.

Hitherto, pulse-shifting registers have commonly comprised a series chain of bistable signal or storage elements which are so interconnected that each element of the chain assumes the signal state of its immediately preceding element when a shift pulse is applied to the network. These shift registers find useful application in the arithmetic operations of electronic computers since the two states of the bistable elements are readily adaptable to process and store signals representing the ZERO or the ONE of a binary mathematical system. One type of computer utilizing such registers is designated as a floating-point machine because it differs from the ordinary fixed-point computer in its numerical notation. For instance, in mathematical practice a number may be expressed by a series of digits multiplied by a power of the radix involved, or simply by the digits and an indication of the power or exponent of the radix. The former is referred to as fixed-point and the latter as floating-point notation. The following example shows the difference between these two forms of numerical expression:

NUMBER FIXED-POINT NOTATION $$70259=0.70259\times 10^5$$

or

FLOATING-POINT NOTATION $$70259+5$$

A computer utilizing the floating-point technique has the advantage of being able to handle both very large and very small numbers by processing only their significant digits and the appropriate exponent. However, it also has a significant disadvantage. This is particularly apparent during addition and subtraction operations which are relatively simple in fixed-point machines but become much more difficult and time-consuming with floating-point equipment because it is necessary to shift in order to match exponents before two numbers can be added together or subtracted one from the other. Consequently, many shift pulses are necessary when the numbers added and subtracted vary markedly in magnitude. For instance, a shifting of a bit to the 17th stage on its right requires seventeen shift pulses. This introduces objectionable delay in a high-speed system.

Thus, it is apparent that a fatser shifting operation is required for floating-point computers to prevent their time disadvantages from outweighing their space and equipment advantages. It is possible to shift to any desired number of positions in one operation by gating each stage of the shift register to every succeeding stage, but the large amount of equipment and interconnections required make such a register economically unfeasible.

Accordingly, an object of the present invention is to provide a shift register which has the capability of shifting any number of places to the right or left with a more efficient combination of speed and circuit complexity than has hitherto been possible. A further object is to provide a reliable as well as an economically feasible improved pulse shifting register. An additional object is to provide an improved technique for performing floating-point arithmetic computations.

These and other objects are accomplished in one illustrative embodiment of the invention by providing a shift register which is capable of shifting to the left (minus direction) or right (plus direction) in single steps and also in multiple steps. For example, a shift register which will be described below has been made capable of shifting from 1 to 17 places to the left or right in three (or less) pulse periods by shifting combinations of 1, 4, 8 and 16 places.

Other objects, features, embodiments and modifications of the invention will be apparent from the following description of this illustrative 17 stage shift register with reference to the accompanying drawings, wherein.

Figure 4B:
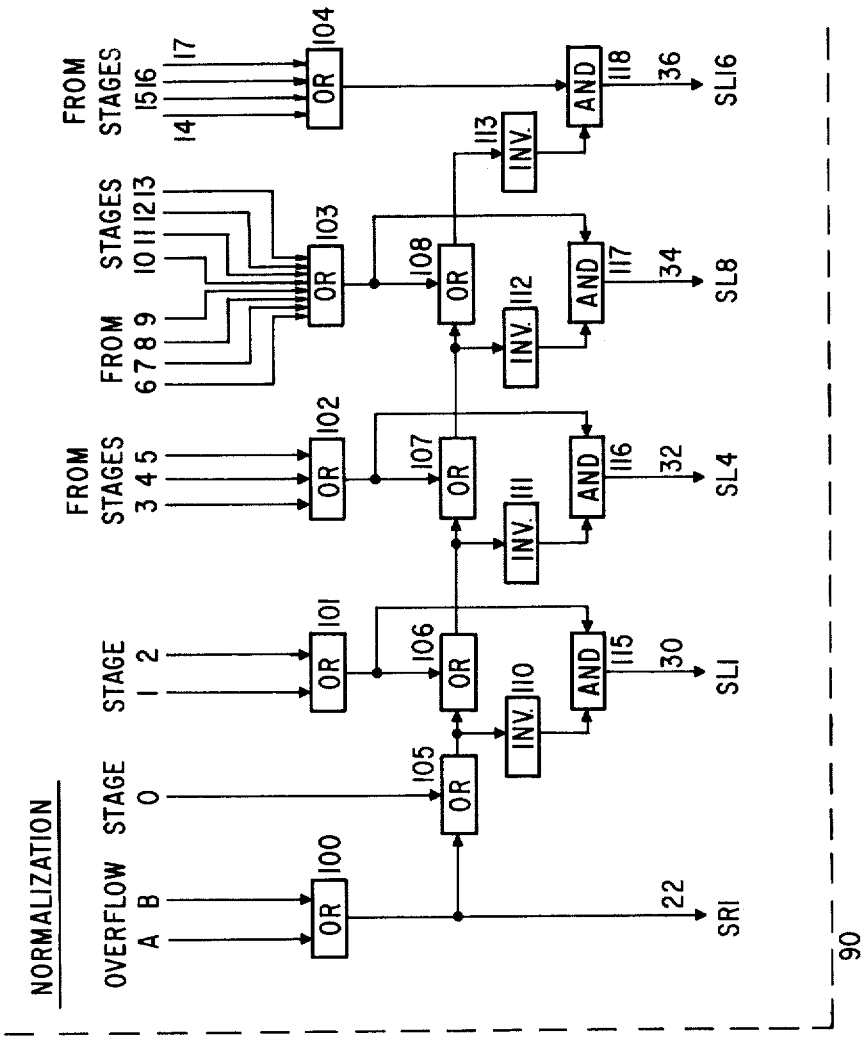
Figure 4A:
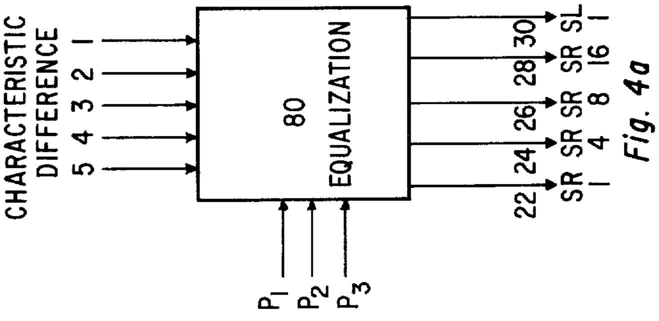

FIGS. 4*a* and *b* are diagrammatic representations of control matrices for "equalizing" and "normalizing" shifts, respectively;

FIG. 5*a* is a table of a shift left code; and

FIG. 5*b* is a table of a shift right code.

As has been explained above, the arithmetic unit of a computer which processes data in floating-point notation must shift the mantissa (i.e. coefficient) of one number with respect to the mantissa of another and thus with respect to an assumed location of a binary point, adjusting the characteristic (i.e. exponent) of the shifted number in the process until both numbers are represented to the same binary power (i.e. have identical characteristics), before one is added to or subtracted from the other. For example, if the binary number 1101+11 (i.e. 1101 raised to the third binary power) in floating binary notation is to be added to 1011+101 (i.e. 1011 raised to the fifth binary power) the first binary quantity must be shifted two positions to the right so that the exponential characteristics of the two quantities are equalized before the addition is performed. Thus, 1101+11 shifted two positions to the right of the floating binary point becomes .001101+101. In the following description, this process of shifting to accomplish this purpose will be referred to as "equalizing."

Similarly, after a sum or remainder has been obtained, the resulting numerical coefficient must be shifted to the right or left with concurrent count upwards or downwards of its characteristic until its most significant digit is located to the right of the location of the binary point during the computation (shift right) or is not a ZERO quantity (shift left). Thus, .001001+101 (fifth power) becomes .1001+11 (third power) before it is processed from the arithmetic unit. In the following description shifting for this purpose will be referred to as "normalizing."

In a floating-point machine the mantissa and the characteristic are assigned given bit locations within the data word and an additional bit is reserved to designate the sign of the characteristic. Storage and processing of this type of data word is accomplished in a conventional manner except for the arithmetic unit. Here, the accumulator for the data word is divided into a shift register portion to process the mantissa digits and a counter to process the characteristic digits. The following description will explain how the shift register portion is constructed and operated in accordance with the present invention.

Figure 1:
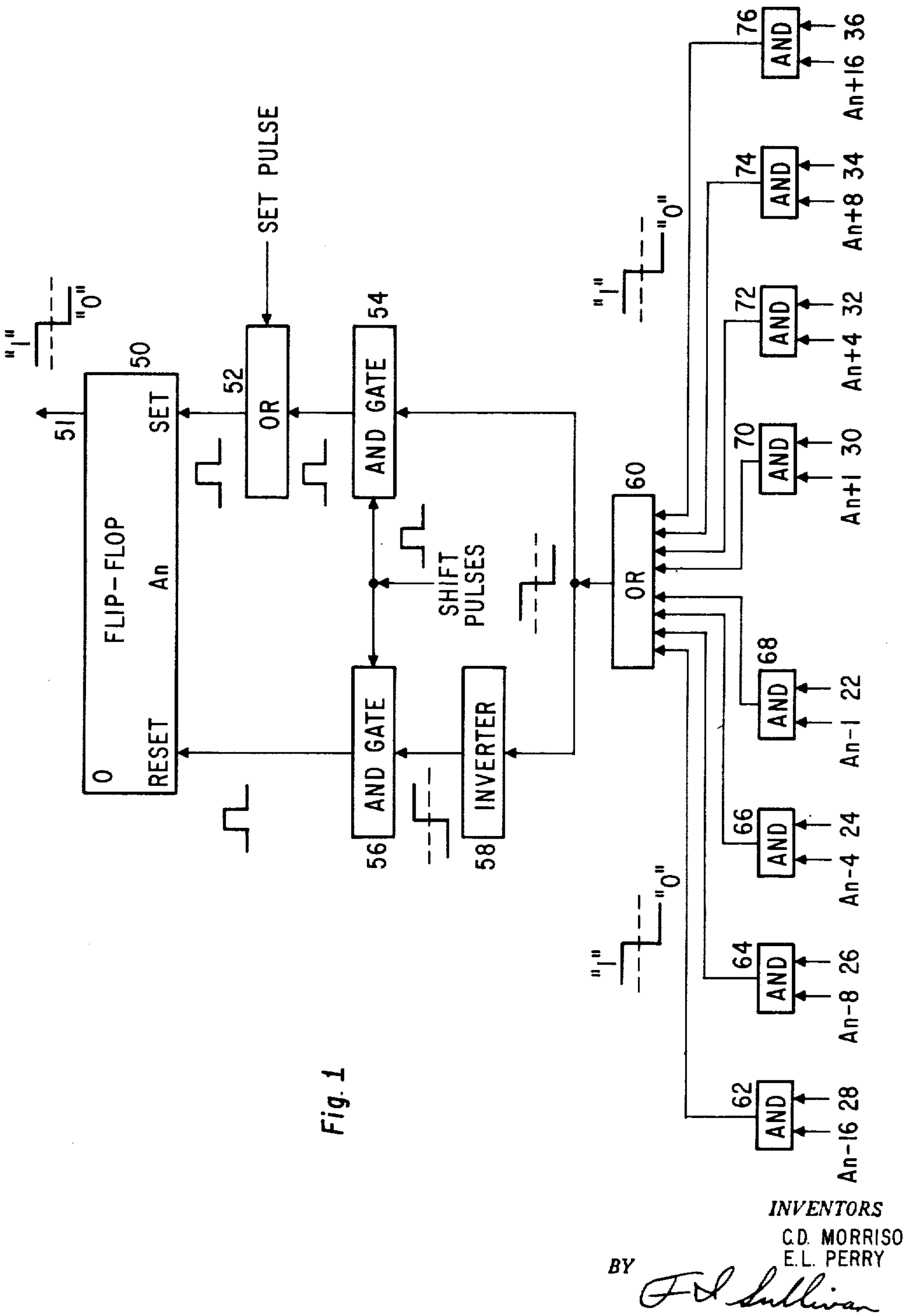
FIG. 1 is a block diagram of a shift register stage.

FIG. 1 shows a single shift register stage, a group of which comprises a shift register. The storage device is a set-reset flip-flop 50, which for the purpose of explanation is designated $A_n$. Each stage 50 represents a binary ONE by assuming a "set" condition with a positive signal level at its single output terminal 51 and a binary ZERO by assuming "reset" condition with a negative signal level at the same terminal. Switching between these two conditions is effected by applying a positive signal pulse to the "set" or "reset" input terminals, respectively, of the flip-flop. This is accomplished by the following combination of circuits: an OR gate 52 which enables the flip-flop 50 to be "set" to the ONE condition by either an appropriate pulse from another flip-flop stage or an external "set" pulse; AND gates 54 and 56 which, in response to shift pulses, process positive input pulses to the "set" and "reset" terminals, respectively, of flip-flop 50; an inverter 58 which assures that the "set" and "reset" lines will not both process positive pulses at the same time; and, an OR gate 60 which transmits to both the "set" and "reset" lines a positive or a negative pulse (indicating a ONE or a ZERO signal) from whatever AND gate 62–76, connected to the output 50 of another flip-flop stage ($A_n \pm 1$–16), is energized by an enabling signal on its particular control line 22–36.

As an example of the operation of this flip-flop stage, assume that AND gate 66 is energized, in a manner which will be explained in more detail below, to transfer the signal condition of the flip-flop $A_{n-4}$ to flip-flop $A_n$. If flip-flop $A_{n-4}$ is in positive, i.e. ONE, signal condition when control line 24 is energized AND gate 66 conducts a positive signal level through OR gate 60 to "set" gate 54 and, via inverter 58, a negative signal level to "reset" gate 56. Thus, when a shift pulse is applied to these two gates, gate 54 with a positive signal on its other input transmits a "set" pulse to flip-flop 50 causing it to assume at its output terminal 51 the ONE (positive) signal level of flip-flop $A_{n-4}$ while the negative signal at gate 56 prevents it from being energized by the shift pulse.

Similarly, a negative, i.e. ZERO, signal transmitted from a selected AND gate 62–76 is transmitted through OR gate 60 to inhibit "set" gate 54 while its positive inversion enables "reset" gate 56. Consequently, when a positive shift pulse is applied to the two gates 54 and 56, gate 56 is energized to "reset" flip-flop 50 to the ZERO condition represented by the negative input to OR gate 60, and "set" gate 54 is disabled.

In the specialized shift register to be described, the $A_{n-1}$, $A_{n-4}$, $A_{n-8}$, and $A_{n-16}$ inputs to each AND circuit 62–76 come from the outputs of the 1st, 4th, 8th and 16th stages to the left of a given stage $A_n$ and the $A_{n+1}$, $A_{n+4}$, $A_{n+8}$, and $A_{n+16}$ inputs are connected to the outputs of the 1st, 4th, 8th and 16th stages to its right. The reason for these selected inputs may best be understood with reference to FIGS. *5a* and *5b*.

FIG. *5a* is a graphical representation of a code for shifting right 1 to 17 places; FIG. *5b* is a graphical representation of a code for shifting left 1 to 17 places. With this arrangement, a maximum of three clock pulses is needed to shift a word any number of places from 1 through 17 to the left or right.

FIG. *5a* shows five basic shifts of 1, 4, 8, and 16 places right and 1 place left. Using these, any shift from 1 to 17 may be obtained. As an example, an 11-place shift right would be accomplished by shifting the word 1 place to the left during the first clock period, 8 places to the right during the second clock period, and 4 places to the right during the third clock period. A shift right may be thought of as a plus and a shift left as a minus since a total shift right is desired ($-1+8+4=11$). The shift left operation is similar to the shift right operation and utilizes five basic shifts of 1, 4, 8 and 16 places left and 1 place right. The significance of the CHARACTERISTIC DIFFERENCE portion of the table of FIG. *5a* will be explained below.

Figure 2:
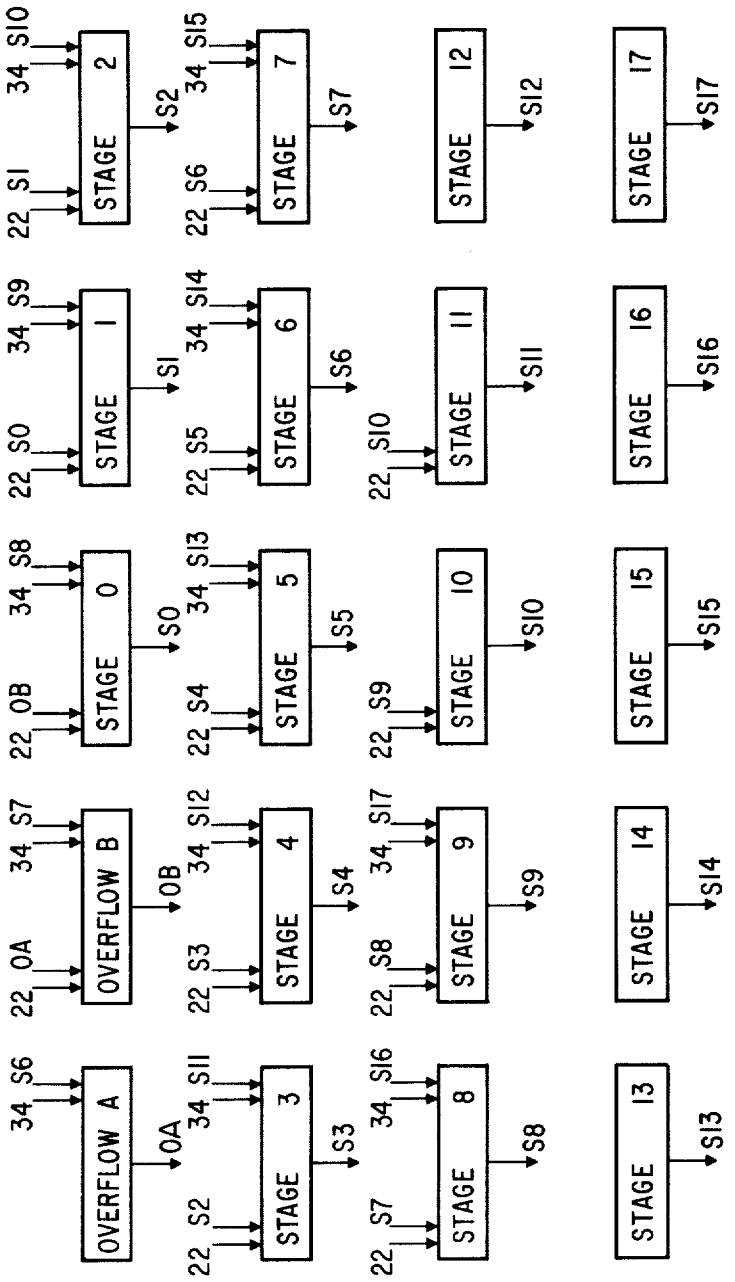
FIG. 2 is a diagrammatic representation of apparatus for shifting a 12-bit word 6 places to the left in a 17 stage shift register.

FIG. 2 depicts the means by which a full word may be shifted. For the sake of diagram simplicity, a sample shift of 6 places left was chosen for demonstration. Assume a 12-bit word is initially "set" into stages 6 through 17. FIG. *5b* shows that a shift left of 6 bits requires a shift left of 8 places, followed by a shift right of 1 place, followed by another shift right of 1 place.

To accomplish the shift left of 8 places, each output of stages 6 through 17 is connected to the $A_{n+8}$ input to AND gate 74 (ref. FIG. 1) of that stage which is located 8 places to the left. The other input 34 to AND gate 74 comes from a shift control matrix 40 (FIG. 3) which will be later described in detail. The result of this shift of eight places left is to transfer the signal content of stages 6–17 to the corresponding 12 stages represented by overflow A, overflow B and 0–9.

To accomplish the first shift right of 1 place, the output of the overflow A stage, the overflow B stage, and stages 0 through 9 is connected to the $A_{n-1}$ input of AND gate 68 of that stage which is located 1 place to the right. Input 22 to AND gate 68 comes from shift control matrix 40.

To accomplish the second shift right of 1 place, the outputs of the overflow B stage and stages 0 through 10 are required to be connected to the $A_{n-1}$ input of AND gate 68 of that stage which is located 1 place to the right and input 22 to AND gate 68 is energized from shift control matrix 40.

Figure 3:
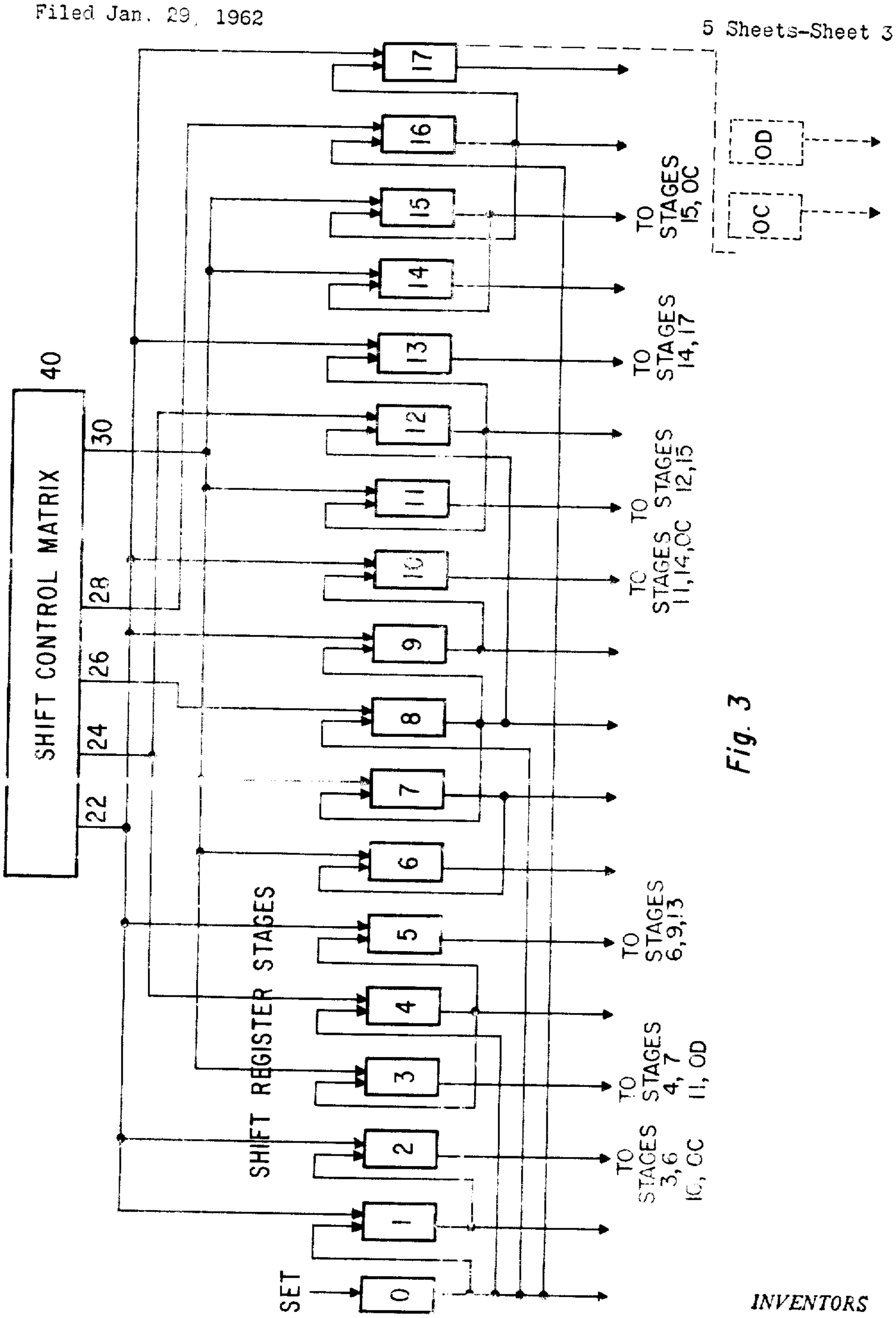
FIG. 3 is a diagrammatic representation of apparatus for shifting a bit any number of places from 1 to 17 to the right.

FIG. 3 shows an eighteen stage shift register with overflow stages C and D, and the means for transferring a single bit any number of places from 1 to 17 to the right. Its operation may be explained by examining it in conjunction with FIG. *5a*. Assume a bit "set" as a ONE into stage 0 via its "set" line to its OR gate 52 (FIG. 1). For a shift of one place right, the output of stage 0 must be connected to the $A_{n-1}$ input of AND gate 68 of stage 1. The coincidence of the bit on this $A_{n-1}$ input and pulse 22 from shift control matrix 40 "sets" a ONE into stage 1.

To shift the ONE bit in stage 0 two places right, the bit is first "set" into stage 1 as was just described. It is then shifted from stage 1 to stage 2. To accomplish this, the output of stage 1 is connected to the $A_{n-1}$ input of AND gate 68 of stage 2. The coincidence of the bit on the $A_{n-1}$ input and pulse 22 from shift control matrix 40 "sets" a ONE into stage 2.

To shift the ONE bit in stage 0 three places right, the output of stage 0 must be connected to the $A_{n-4}$ input of AND gate 66 of stage 4. The coincidence of the bit on this $A_{n-4}$ input and pulse 24 from shift control matrix 40 "sets" stage 4 to the ONE state. A shift left of one place is now necessary. To accomplish it, the output of stage 4 is connected to the $A_{n+1}$ input of AND gate 70 of stage 3. The coincidence of a pulse on this $A_{n+1}$ line and pulse 30 on the other input from shift control matrix 40 "sets" stage 3 to the ONE state.

In like manner, shifts 4 through 17 may be executed following the circuit connections diagrammed in FIG. 3. The outputs of those stages not involved in this bit transfer action are labeled to show their connections to other stages for all shift right operations. More particularly, they are each connected to one of AND gates 62–76 of the stage (see FIG. 1).

The shift control matrix 40, which generates the standard shift left and shift right pulses, is shown in more detail in FIGS. *4a* and *b*. There are two units in matrix 40 because it is used in a floating-point system wherein the previously described processes of equalization and normalization must be performed.

As has been explained, shift right of a word is required in floating-point computations during the equalizing process, which is necessary before performing arithmetical computations. As an example, assume an addition of two words is to be performed. If they do not have equivalent exponents or characteristics, the smaller word must be shifted the appropriate number of places to the right. The difference between characteristics is first found and then is used to determine the necessary number of shift places. This characteristic difference together with the appropriate clock pulses are the inputs to the decoding matrix 80 wherein the standard pulses for a total shift right are generated. This matrix 80 is comprised of conventional logic circuits satisfying the conditions and equations set forth below.

Reference to the table of FIG. *5a* demonstrates that a shift right one place is accomplished in a straightforward single one step shift-to-the-right operation, a shift right two places by two single step shift-to-the-right operations, a shift right three places by a four place-to-the-right and a single one-place-to-the-left operation, etc.

The number of places to be shifted is determined by the difference between the characteristics of the two operands to be added or subtracted. For example, if a mantissa raised to the third power (binary 11) is to be added to a mantissa raised to the eighth power (binary 1000) conventional subtraction logic connected to those stages of the arithmetic unit containing the characteristics of the two mantissas involved will produce a result of 1000 minus 11=101, i.e. decimal 5. This is demonstrated in FIG. 5*a* where the binary equivalents of decimal shift places are shown in the CHARACTERISTIC DIFFERENCE column. This difference is represented by corresponding ZERO and ONE signals on the five characteristic difference lines 5—1 connected between the subtraction logic referred to previously and the vertical coordinate inputs of equalization matrix 80.

The horizontal coordinate inputs of this matrix 80 are the lines P1–P3 representing pulses at three corresponding clock periods. In order to be able to accomplish any shift of up to 17 places to the right within a maximum of three shifts from the combination of 1, 4, 8, and 16 shifts right and 1 shift left, the following allocation of shifitng times is made:

Pulse period 1 (P1)—shift right 1 or shift left 1
Pulse period 2 (P2)—shift right 8 or shift right 16
Pulse period 3 (P3)—shift right 1, shift right 4, or shift left 1.

The combination of these pulse period allocations with energization of lines 5—1 in the input to matrix 80 satisfy the following equations to energize the proper combination of control lines 22–30 (FIGS. 1 and 4*a*) to effect the indicated number of shifts to the right.

$$SR1=\bar{2}\cdot 1\cdot P1+\bar{3}\cdot 2\cdot \bar{1}(P1+P3)=22$$
$$SR4=(\bar{2}\cdot 3\cdot 1\cdot 2\cdot \bar{3})P3=24$$
$$SR8=(\bar{2}\cdot 4+\bar{3}\cdot 4+2\cdot 3\cdot \bar{4})P2=26$$
$$SR16=(3.4+5)P2=28$$
$$SL1=1\cdot 2\cdot P1+2\cdot 3\cdot P1+3\cdot 2\cdot \bar{1}\cdot P3=30$$

As has been explained, numbers 1, 2, 3, 4, and 5 in these equations correspond to the bits of the characteristic difference whereas pulses P1, P2, and P3 are clock pulses corresponding to the respective periods.

These equations are easily implemented by AND, OR, and inverter circuits. Since performing such implementation is well-known to those versed in the state of the art, only block 80 is shown in FIG. 4*a* to represent the equalizing or shift right circuitry.

In the previous discussion of floating-point notation, it has been explained that the most significant bit is never taken as a ZERO. Consequently, quite often it is necessary to normalize the result of an arithmetic operation when the most significant bit does not occur in the first shift register stage. This normalization process may require shifts of many places to the left. FIG. 4*b* shows normalization circuitry for generating the basic shift left pulses, viz. shift left one, shift left four, shift left eight, shift left sixteen, and shift right one.

Referring to FIG. 4*b*, a plurality of OR circuits 100–104 have their individual inputs connected to the indicated shift register stages, and a combination of OR circuits 105–108 and inverters 110–113 perform the function of inhibiting all shift pulses other than the correct one from being generated at one time. Control pulses along lines SL1, SL4, SL8 and SL16 are transmitted from corresponding AND gates 115–118 and a control pulse on line SR1 is derived directly from OR gate 100.

The circuit operates in the following manner. If a One is present in either overflow A or overflow B stages, OR gate 100 transmits a pulse along line 22 to connect each shift register stage $A_n$ (FIG. 1) to its preceding stage to the right, i.e., $A_{n-1}$. It also, via OR gates 105–108 and inverters 110–113 inhibits AND gates 115–118 and thus prevents the other shift lines 30–34 from being energized. In addition, a ONE in stage 0, which is the objective of the normalizing process, inhibits all of the shift lines.

A ONE in stages 1 or 2 will energize AND gate 115 by means of OR gate 101, provided the content of stage 0 is a ZERO converted by inverter 110 to a positive pulse input to this gate 115. This results in one or two single shifts left, depending upon whether stage 1 contained the ONE or stage 2 contained it with a ZERO in stage 1. As explained previously with reference to FIG. 1, these single place shift left operations are effected by connecting each shift register stage $A_n$ to its immediately adjacent stage to the right, i.e., $A_{n+1}$, during a shift pulse period.

Similarly, a ONE in any succeeding stage 3–17 of the register energizes its corresponding AND gate 116–118 to provide control signals along corresponding control lines 32–36 to effect four, eight or sixteen place shifts provided preceding stages contain ZEROS which are converted by inverters 111–113 to positive signal inputs at their respective AND gates. A further subsystem of decoders (not shown) connected to lines 22–36 may be employed to actuate a counter for indicating the number and direction of places the data content of the register has been shifted during the normalizing process so that the characteristic of the mantissa may be adjusted for proper floating-point notation.

Thus, in this illustrative embodiment of the invention, the data content of the shift register may be shifted to the right or left any given number of places from one through seventeen in a maximum of three steps or pulse periods.

Although a specialized shift register useful in performing floating-point arithmetic functions has been described, the invention is not limited to the specifics of this description and its accompanying drawings, but embraces the full scope of the following claims.

What is claimed is:

1. Shifting apparatus for shifting an "*m*" binary digit number by a desired number of places between "0" and ±"*n*" in one multi-place shift when said desired number is one of a selected plurality of numbers and in a plurality of multi-place shifts when said desired number is not one of said selected plurality comprising, in combination, a plurality of information shift register stages operative to store said binary number before shifting any number of places and after shifting said desired number of places, each of said stages including a bistable signal storage device, a plurality of overflow shift register stages operative to store the overflowing binary digits of said binary number after each except the last of said plurality of shifts and each including a bistable signal storage device, means interconnecting said information stages and said overflow stages, and means connected to said interconnecting means and coactively operative therewith to selectively shift said binary number said desired number of places by selectively shifting said binary number in one or more multi-place shifts.

2. In a data processing system, shifting apparatus for shifting an "*m*" binary digit number by a desired number of places between "0" and ±"*n*," some of said desired number being in a selected group of numbers between "0" and "*n*," said shifting apparatus comprising, in combination, a plurality of shift register stages each including a bistable signal storage device, means interconnecting said signal storage stages, and means connected to said inter-connecting means and coactively operative therewith to selectively shift said binary number said desired number of places by selectively shifting said binary number in one multi-place shift if said desired number is one of said selected group and in a combination of multi-place shifts in either or both the plus and minus directions if said desired number is not one of said selected group.

3. In a data processing system, shifting apparatus for shifting an "*m*" binary digit number by a desired number of places between "0" and ±"*n*" in one or more multi-place shifting operations comprising, in combination, a shift register including a plurality of information stages and a plurality of overflow stages, each stage including a set-reset flip-flop circuit operative to store a binary digit and one or more gating circuits each having first and second input terminals and an output terminal, means connecting each of the first input terminals of said gating circuits of the said each stage to a different one of the register stages located immediately adjacent to the said each stage and located at all multiples of a selected number of places away from the said each stage in the plus and minus directions, means connecting the output terminals of said gating circuits of the said stage to the flip-flop of the said each stage, and a switching matrix having a plurality of output terminals equal in number to the number of gating circuits in that one of said stages having the largest number of gating circuits, means connecting each of the output terminals of said switching matrix to the second input terminal of all corresponding ones of said gating circuits connected to stages located the same number of places away and in the same direction, said switching matrix being operative to selectively apply one or more successive shifting pulses each of which is operative to open selected gating circuits and to cause each selected gating circuit to allow a signal only from the other stage connected to the first input terminal thereof to be applied to the connected flip-flop circuit.

4. For a floating point computer wherein two binary digit numbers are equalized before the performance of arithmetical computations and including means for determining the characteristic difference between said binary numbers, equalization apparatus comprising, in combination, a multi-stage shift register operative to store the smaller one of said binary numbers, means operative to sense said characteristic difference and responsive thereto to selectively generate one multi-stage shift signal if said difference is one of a group of selected numbers and to generate a plurality of successive multi-stage shift signals if said difference is not one of said selected group of numbers, each of said shift signals being capable of producing one of a plurality of different multi-stage shifts, and means connected to said last-mentioned means and to said last-mentioned means and to said shift register and operative to shift said smaller binary number by the number of places represented by said signal each time one of said shift signals is received.

5. For a floating point computer wherein a binary number is treated in normalized notation, normalization apparatus comprising, in combination, a multi-stage shift register operative to store said binary number, a plurality of gating means connected to said shift register, each operative to open to allow the binary number stored in said shift register to shift a different plurality of places, and means connected to said register and said plurality of gating means operative to repeatedly sense the location of said binary number and responsive thereto to selectively open one of said gating means until said sensing means determines that normalization is complete.

References Cited by the Examiner

UNITED STATES PATENTS

| | | | |
|---|---|---|---|
| 3,043,509 | 7/62 | Brown et al. ---------- | 235—156 |
| 3,076,181 | 1/63 | Newhouse et al. -------- | 340—166 |

MALCOLM A. MORRISON, *Primary Examiner.*

NEIL C. READ, *Examiner.*